(No Model.)
C. E. STONESIFER.
TOOTH SECURING DEVICE FOR AGRICULTURAL MACHINES.
No. 322,567. Patented July 21, 1885.
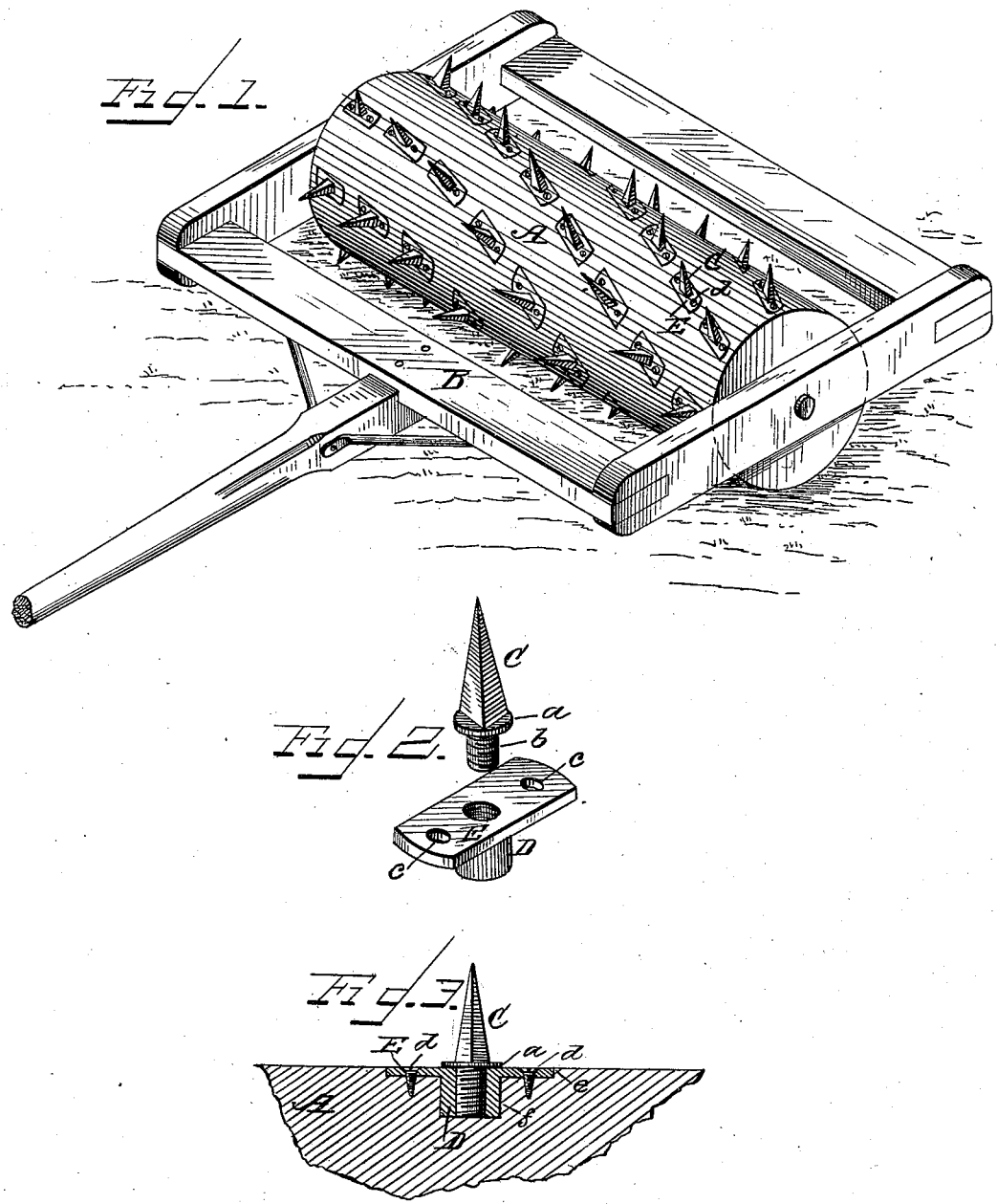
WITNESSES
J. L. Ourand
L. L. Miller
INVENTOR
Christian E. Stonesifer
per Chas. H. Fowler
Attorney

United States Patent Office.

CHRISTIAN E. STONESIFER, OF BOONSBOROUGH, MARYLAND.

TOOTH-SECURING DEVICE FOR AGRICULTURAL MACHINES.

SPECIFICATION forming part of Letters Patent No. 322,567, dated July 21, 1885.

Application filed November 20, 1884. (No model.)

*To all whom it may concern:*

Be it known that I, CHRISTIAN E. STONESIFER, a citizen of the United States, residing at Boonsborough, in the county of Washington and State of Maryland, have invented certain new and useful Improvements in the Means for Inserting the Teeth in Clod-Crushers and other Agricultural Implements; and I do hereby declare that the following is a full, clear, and exact description of the same, reference being had to the annexed drawings, making a part of this specification, and to the letters and figures of reference marked thereon.

Figure 1 of the drawings is a perspective view of a clod-crusher embodying my invention; Fig. 2, a perspective view of the screw-threaded socket and tooth disconnected from each other; and Fig. 3, a detail sectional view of a portion of the roller, showing the manner of connecting the screw-threaded socket and tooth thereto.

The present invention has relation to a simple and effective means of securely connecting the teeth in position on the cylinders or rollers of clod-crushers, clover-hullers of thrashing-machines, and all classes of agricultural implements and machines wherein teeth are used and secured to a wooden cylinder, roller, or other base of like material; and it consists in the employment of interiorly-screw-threaded sockets provided with a fastening-plate, in connection with teeth having annular flanges to bear against the upper side of the plates, substantially as shown in the drawings, and hereinafter described and claimed.

In order to more clearly illustrate my invention, I have shown a clod-crusher as one of the many forms of agricultural machines or implements to which the improvement is applicable, and consists of the usual roller, A, of wood, suitably journaled to a frame, B, and provided upon its periphery with teeth C. Each tooth has an annular flange, $a$, and screw-threaded shank $b$, said shank entering an interiorly-screw-threaded socket, D. The socket D is cast with a fastening-plate, E, upon its upper end, having holes $c$ to receive screws $d$, by which means the plate is firmly secured in a mortise, $e$, formed in the periphery of the roller, the socket entering a correspondingly-shaped opening or cavity, $f$.

In place of screws any other convenient means may be employed for fastening the plate of the socket in position—such as spurs cast upon the under-side of the plate and driving them in the wood; but screws I consider preferable.

The exterior shape of the socket is not at all essential, it being cylindrical or other form, as preferred, and the teeth may be of any of the usual shapes, depending entirely upon the use to which they are put, the screw-shank thereof and the annular flange being the only features essential to engage with the interiorly-screw-threaded socket and bear against the upper side of the plate, said flange being an important element in the tooth, as it prevents binding of the screw-threads of both the socket and shank when pressure is brought on the tooth in entering the soil.

The mortise in which the fastening-plate of the socket fits is considered of very great importance, as when pressure is brought against the tooth in any direction the mortise will hold the plate against sidewise or lateral pressure against the screws, which would tend to loosen them.

Having now fully described my invention, what I claim as new, and desire to secure by Letters Patent, is—

In a roller or frame provided with teeth, the combination of interiorly-threaded sockets independent of said frame or roller, and seated in mortises therein, with teeth having threaded shanks to enter said sockets, and flanged to abut against the surface thereof, substantially as shown and described.

In testimony that I claim the above I have hereunto subscribed my name in the presence of two witnesses.

CHRISTIAN E. STONESIFER.

Witnesses:
C. A. NEALE,
CHAS. R. WRIGHT.